United States Patent [19]
Hein

[11] Patent Number: 5,238,233
[45] Date of Patent: Aug. 24, 1993

[54] JOUNCE BUMPER WITH HOOP STRESS RINGS

[75] Inventor: Richard D. Hein, Wabash, Ind.

[73] Assignee: GenCorp Inc., Fairlawn, Ohio

[21] Appl. No.: 945,043

[22] Filed: Sep. 15, 1992

[51] Int. Cl.$^5$ ............................................. F16F 1/36
[52] U.S. Cl. ............................ 267/153; 248/634; 267/140; 267/292; 280/716; 180/312
[58] Field of Search ............... 267/33, 140, 141, 153, 267/292; 248/634; 180/300, 312, 902; 280/716

[56] References Cited

U.S. PATENT DOCUMENTS

| | | | |
|---|---|---|---|
| 3,118,659 | 1/1964 | Paulsen | 267/292 X |
| 3,412,990 | 11/1968 | Gladstone | 267/153 X |
| 3,460,786 | 8/1969 | Rivin | 267/153 X |
| 3,625,501 | 12/1971 | Hein et al. | 267/153 |
| 3,756,551 | 9/1973 | Bishop | 267/153 X |
| 4,790,520 | 12/1988 | Tanaka et al. | 267/292 X |

FOREIGN PATENT DOCUMENTS

| | | | |
|---|---|---|---|
| 601705 | 7/1960 | Canada | 267/292 |
| 1017201 | 10/1957 | Fed. Rep. of Germany | 267/153 |
| 1255720 | 1/1961 | France | 267/153 |
| 218844 | 9/1986 | Japan | 267/153 |
| 2011579 | 7/1979 | United Kingdom | 267/141 |

*Primary Examiner*—George E. A. Halvosa

[57] ABSTRACT

A resilient, elastomeric jounce bumper is described as having a cylindrical head which protrudes from a larger diameter cylindrical body which has a cylindrical extension which surrounds at least a portion of the head in spaced radial relation, such that an annular void is formed around the head in the area of the body extension. The outer, free annular end of the body extension curves inwardly towards the head and terminates in close proximity to the head to prevent harmful particulate matter from entering the annular void. The body extension is provided with at least one, circular metal ring which is embedded in the extension adjacent the curved end of the extension to restrict radial expansion of the head, when the bumper is place under a heavy load.

8 Claims, 1 Drawing Sheet

JOUNCE BUMPER WITH HOOP STRESS RINGS

BACKGROUND OF THE INVENTION

The invention relates to an automotive deflection control device, especially to a jounce bumper which is used in conjunction with an automobile suspension system where it is important to provide progressively greater shock resisting characteristics.

More particularly, the invention is an improvement in the jounce bumper which is described and claimed in my copending patent application Ser. No. 07/790,741 which was filed Nov. 8, 1991, and which will issue on Sep. 22, 1991 as U.S. Pat. No. 5,149,069. The jounce bumper of my earlier patent application is provided with a rigid, cylindrical metal sleeve which is designed to restrict radial expansion of the rubber bumper when a load is applied against the bumper. It has been found that under certain loading conditions, the metal sleeve can be crushed or severely distorted to adversely effect operation of the bumper. This invention is designed to overcome this problem while providing ample radial restriction of the bumper.

Briefly stated, the invention is in a resilient elastomeric jounce bumper which essentially comprises a cylindrical, load contacting head which protrudes from a larger diameter, cylindrical body which has a cylindrical extension which surrounds the head in spaced, radial relation, such that around the head is formed an annular void into which the head can expand, when placed under a load. The free outer annular end of the body extension curves inwardly towards the head and terminates in close proximity to the head in axial spaced relation from the outer, blunted end of the head. At least one, hollow, circular metal ring is embedded in the body extension to limit radial expansion of the head beyond filling of the annular void.

DESCRIPTION OF THE DRAWING

The following description of the invention will be better understood by having reference to the accompanying drawing, wherein.

DETAILED DESCRIPTION OF THE DRAWING

Figure 1:
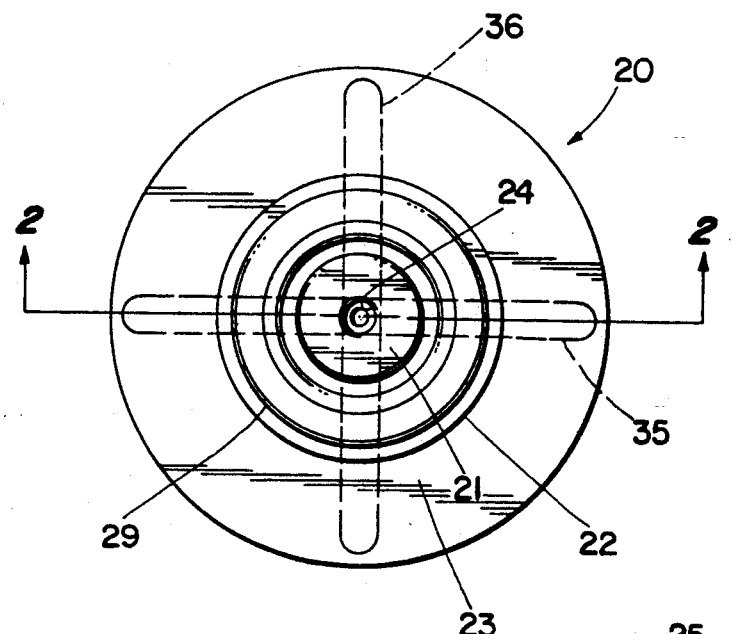
FIG. 1 is a plan view of a jounce bumper which is made in accordance with the invention.
Figure 2:
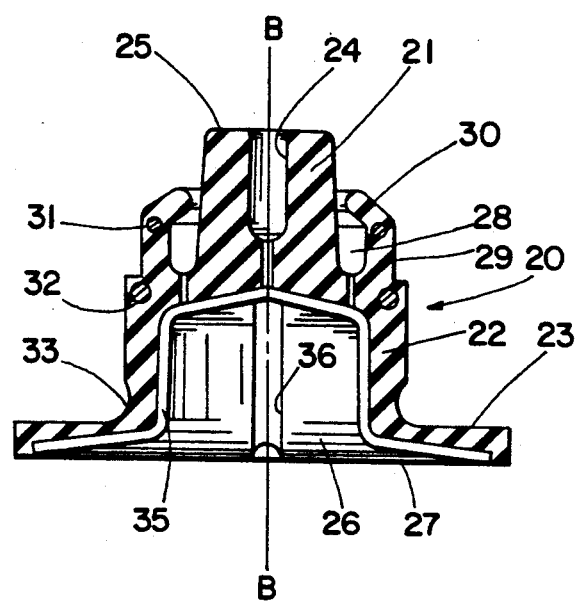
FIG. 2 is a section of the bumper viewed from the line 2—2 of FIG. 1.

With general reference to the drawing for like parts and particular reference to FIG. 2, there is shown a jounce bumper 20 which is composed of any suitable resilient elastomeric material, e.g. rubber. The bumper 20 includes a cylindrical, load contacting bumper head 21 which protrudes from a larger diameter, cylindrical body 22 which terminates at an even larger diameter, outstanding annular flange 23 which is in a plane that is normal to the center axis B—B of the bumper 20. A generally cylindrical, center void 24 extends vertically into the bumper head 21 from the outer, vertically uppermost, blunted top end 25 of the bumper head 21, when the center axis B—B of the bumper 20 is vertically oriented, as will be assumed for purposes of this description. A larger diameter, generally cylindrical center void 26 extends vertically inwardly of the bumper body 22 from the opposing, flared bottom end 27 of the bumper 20. The upper and lower voids 24 and 26 of the bumper head 21 and body 22, respectively, are in axially spaced back-to-back relation. Surrounding the bottom half of the bumper head 21 is an annular void 28 into which the bumper head 21 can expand, when placed under a load. A cylindrical extension 29 extends upwardly from the bumper body 22 in radial spaced relation from the bumper head 21 to form the annular void 28. The body extension 29 has an upper, annular free end 30 which curves inwardly towards the bumper head 21 and terminates in close proximity to the head 21 to prevent harmful particulate matter from entering the annular void 28.

Figure 3:
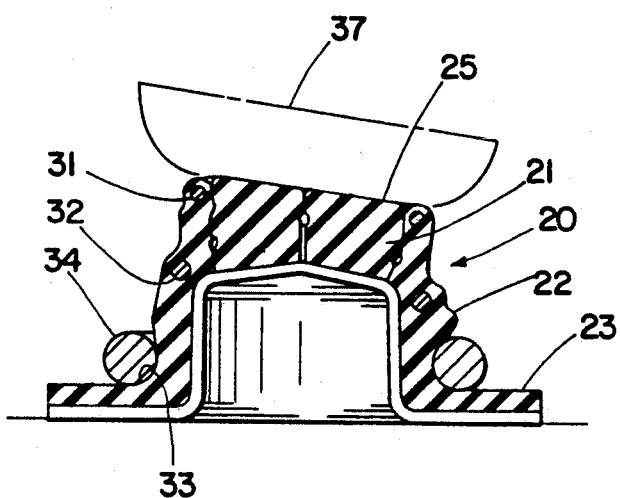
FIG. 3 is a similar section of the bumper in assembled relation with a coil spring and under load.

A pair of similar, rigid, circular metal rings 31 and 32, are provided to restrict lateral or radial expansion of the bumper head 21 beyond closure of the annular void 28 by the bumper head 21 when under a heavy load, as seen in FIG. 3. The upper metal ring 31, closest the blunted top end 25 of the bumper head 21, is embedded in the body extension 29 adjacent, or just below the upper curved end 30 of the body extension 29 and can be lighter than the lower, heavier ring 32 which is embedded in the bigger bumper body 22 adjacent, or just below the annular base of the body extension 29 connected to the bumper body 22. It can be appreciated that the upper and lower metal rings 31 and 32, because of their axial spacing, can move independently of each other, so as to withstand, without damage, occasional skew loading which causes damage to the solid, cylindrical reinforcing sleeve of the jounce bumper of my prior, copending patent application.

An annular seat 33 is formed at the outer juncture of the bumper body 22 with the annular flange 23 to receive a heavy coil metal spring 34 and is designed to compress the body radially inwardly towards the void therein.

A pair of crosswise, intersecting air passageways 35 and 36, (FIG. 2), are provided to allow the escapement of any air trapped between the bumper 20 and adjacent metal cap (not shown) in the center void 26 of the bumper body 22, when the bumper 20 is under load from, for example, a contacting cap 37 which is part of the automobile frame or chassis.

The volume of the annular void 28 is designed to correspond to the displacement of the bumper head 21 under maximum loading conditions, after which the bumper head 21 is restricted from lateral or radial expansion by the surrounding metal rings 31 and 32. The upper free end 30 of the body extension is designed to protect the annular void 28 from particulate matter which might adversely effect the deformation of the bumper head 21 under load. The top center void 24 acts to soften the initial load characteristics of the bumper head 20, and provide a smooth, gradual transition between the initial and maximum load dampening characteristics of the bumper 20.

Thus, there has been described an improved jounce bumper assembly, wherein the axial movement of the bumper, in response to a heavy load, is restricted by restraining the lateral or radial expansion of the bumper head by a pair of axially spaced hollow, metal reinforcement rings or hoops to optimize the maximum load dampening characteristics of the bumper. The bumper head is given space to expand radially by the provision of a surrounding annular void whose volume is correlated to the displacement of the bumper head under a predetermined load.

What is claimed is:

1. A jounce bumper, comprising:
   a) a generally cylindrical, resilient elastomeric head protruding from an integral, larger diameter, generally cylindrical elastomeric body, the head and body having centrally disposed voids extending therein towards each other so as to be in back-to-back spaced relation, the body terminating in axial spaced relation from the head at an even larger diameter, outstanding elastomeric flange;
   b) an integral, generally cylindrical elastomeric expansion of the body extending from the body and flange in surrounding, spaced relation around the head and forming an annular void around the head, the extension having a free outer end which curves inwardly towards the head and terminates in close proximity to the head in spaced axial relation from a free outer end of the head opposite the annular flange; and
   c) at least one, rigid, hollow circular ring embedded in the elastomeric material of the body extension to restrict radial expansion of the head in the direction of the extension.

2. The jounce bumper of claim 1, which includes a second, rigid, hollow circular ring embedded in the elastomeric material of the body adjacent the extension.

3. The jounce bumper of claim 2, wherein the at least one ring embedded in the extension is located adjacent the curved end of the extension.

4. The jounce bumper of claim 3, wherein the elastomeric material is rubber.

5. The jounce bumper of claim 4, wherein the rigid rings are metal rings.

6. The jounce bumper of claim 5, wherein the second ring is bigger than the ring in the body extension.

7. The jounce bumper of claim 3, wherein an annular seat is formed between the body and annular flange to receive a metal coil spring and is designed to compress the body radially inwardly towards the void therein.

8. The jounce bumper of claim 3, which includes a plurality of air passageways formed in the surface of at least the portion of the body confronting the void therein.

* * * * *

UNITED STATES PATENT AND TRADEMARK OFFICE
CERTIFICATE OF CORRECTION

PATENT NO.  : 5,238,233
DATED       : August 24, 1993
INVENTOR(S) : Richard D. Hein It is certified that error appears in the above-indentified patent and that said Letters Patent is hereby corrected as shown below:

Column 3, bridging lines 10 and 11, delete the word "expansion" and substitute therefor --extension--.

Signed and Sealed this

Twenty-first Day of June, 1994

Attest:

BRUCE LEHMAN

Attesting Officer

Commissioner of Patents and Trademarks